United States Patent
Lin

(10) Patent No.: US 11,424,782 B2
(45) Date of Patent: Aug. 23, 2022

(54) SLIDE TYPE MOBILE PHONE HOLDER

(71) Applicant: Chien-Ting Lin, Santa Fe Springs, CA (US)

(72) Inventor: Chien-Ting Lin, Santa Fe Springs, CA (US)

( * ) Notice: Subject to any disclaimer, the term of this patent is extended or adjusted under 35 U.S.C. 154(b) by 0 days.

(21) Appl. No.: 17/220,243

(22) Filed: Apr. 1, 2021

(65) Prior Publication Data

US 2021/0314012 A1    Oct. 7, 2021

(30) Foreign Application Priority Data

Apr. 2, 2020 (CN) .......................... 202020466849.9

(51) Int. Cl.
    *F16M 11/04*    (2006.01)
    *H04B 1/3877*   (2015.01)
    *H04M 1/04*    (2006.01)

(52) U.S. Cl.
    CPC ......... *H04B 1/3877* (2013.01); *F16M 11/041* (2013.01); *H04M 1/04* (2013.01); *F16M 2200/066* (2013.01)

(58) Field of Classification Search
    CPC ................. F16M 11/041; F16M 13/00; F16M 2200/066; B60R 11/0241; B60R 2011/0071; H04B 1/3877; H04M 1/04
See application file for complete search history.

(56) References Cited

U.S. PATENT DOCUMENTS

| | | | | |
|---|---|---|---|---|
| 6,285,758 | B1* | 9/2001 | Lu | H04M 1/04 |
| | | | | 379/446 |
| 9,473,606 | B1* | 10/2016 | Sumida | H04M 1/04 |
| 10,118,565 | B2* | 11/2018 | Kim | B60R 11/0241 |
| 10,253,926 | B1* | 4/2019 | Fan | F21V 21/096 |
| 10,598,199 | B1* | 3/2020 | Fan | B60R 11/0241 |
| 10,626,899 | B2* | 4/2020 | Lien | F16B 2/02 |
| 10,663,104 | B2* | 5/2020 | Yang | H04B 1/3877 |
| 11,075,664 | B2* | 7/2021 | Lin | H04B 1/3877 |
| 2018/0043840 | A1* | 2/2018 | Minn | B60R 11/0241 |
| 2018/0363841 | A1* | 12/2018 | Qiu | F16M 13/02 |

* cited by examiner

*Primary Examiner* — Bradley Duckworth
(74) *Attorney, Agent, or Firm* — Lin & Associates Intellectual Property, Inc.

(57) ABSTRACT

A slide type mobile phone holder includes: a first coupling portion having a first clamp portion and provided with first coupling and outer accommodation portions at first coupling and outer surfaces thereof, respectively, a first coupling wall and a first sliding groove provided between the first coupling and outer accommodation portions, the first coupling accommodation portion having a first coupling protrusion and a first hook; a second coupling portion having a second clamp portion and provided with second coupling and outer accommodation portions at second coupling and outer surfaces thereof, respectively, a second coupling wall and a second sliding groove provided between the second coupling and outer accommodation portions, the second coupling accommodation portion having a second coupling protrusion and a second hook; and a spring member abutting against the first and second coupling protrusions. The first and second coupling portions are assembled together for clamping a mobile phone.

7 Claims, 22 Drawing Sheets

SLIDE TYPE MOBILE PHONE HOLDER

CROSS-REFERENCE TO RELATED APPLICATION

This application claims the priority of CN patent application No. 202020466849.9, filed on Apr. 2, 2020, which is incorporated herewith by reference.

BACKGROUND OF THE INVENTION

1. Field of the Invention

The present invention relates generally to a mobile phone holder, and more particularly, to a slide type mobile phone holder.

2. The Prior Arts

The existing mobile phone holders are provided with a spring member inside. However, many mobile phone holders still need an additional fastener to assemble two clamp portions together. The expanded state and the collapsed state of two clamp portions are controlled by a spring member. Such a design requires an additional component to accomplish the assembly. As such, it is a waste of production resources.

The two clamp portions of the existing mobile phone holder are coupled together along a direction in which the two clamp portions are expanded and collapsed. This mobile phone holder is stable in structure, but is not beneficial to the production and assembly. It consumes manufacturing resources, and thus leads to a waste of resources.

SUMMARY OF THE INVENTION

To overcome the problem of the waste of resources in the production of the existing mobile phone holders, the present invention provides a slide type mobile phone holder, in which a first coupling surface and a second coupling surface are coupled together, two ends of a spring member abut against a first coupling protrusion and a second coupling protrusion, respectively, a first hook hooks a second coupling wall, a second hook hooks a first coupling wall, a first clamp portion and a second clamp portion are separated from each other, a mobile phone is placed in a clamping space, and by an action of the spring member, the first clamp portion and the second clamp portion are close to each other until the mobile phone is clamped. The present invention can maintain the convenience of use, increase the assembly efficiency, and save the resource consumption.

The technical solution adopted by the present invention to solve the technical problems is to provide a slide type mobile phone holder for clamping a mobile phone, comprising: a first coupling portion having a rectangular shape, wherein an end of the first coupling portion is provided with a first clamp portion, a pair of opposite surfaces on both sides of the first coupling portion are respectively defined as a first coupling surface and a first outer surface, the first coupling portion is provided with a first coupling accommodation portion having a rectangular shape and a first outer accommodation portion having a rectangular shape at the first coupling surface and the first outer surface, respectively, and a first coupling wall between the first coupling accommodation portion and the first outer accommodation portion, the first coupling wall is provided with a first sliding groove, an end of the first coupling accommodation portion far away from the first clamp portion is provided with a first coupling protrusion, and the first coupling protrusion is extended with a first hook; a second coupling portion having a rectangular shape, wherein an end of the second coupling portion is provided with a second clamp portion, a pair of opposite surfaces on both sides of the second coupling portion are respectively defined as a second coupling surface and a second outer surface, the second coupling portion is provided with a second coupling accommodation portion having a rectangular shape and a second outer accommodation portion having a rectangular shape at the second coupling surface and the second outer surface, respectively, and a second coupling wall between the second coupling accommodation portion and the second outer accommodation portion, the second coupling wall is provided with a second sliding groove, an end of the second coupling accommodation portion far away from the second clamp portion is provided with a second coupling protrusion, and the second coupling protrusion is extended with a second hook; and a spring member. The first clamp portion and the second clamp portion are arranged toward a same direction, the first coupling surface and the second coupling surface are opposite to each other, two ends of the spring member respectively abut against the first coupling protrusion and the second coupling protrusion, the first coupling protrusion is inserted into the second coupling accommodation portion, the first hook passes through the second sliding groove and hooks the second coupling wall inside the second outer accommodation portion, meanwhile the second coupling protrusion is inserted into the first coupling accommodation portion, the second hook passes through the first sliding groove and hooks the first coupling wall inside the first outer accommodation portion, the first coupling protrusion and the first hook are respectively slidable in the second coupling accommodation portion and the second sliding groove, the second coupling protrusion and the second hook are respectively slidable in the first coupling accommodation portion and the first sliding groove, a clamping space is formed between the first clamp portion and the second clamp portion, when the first clamp portion and the second clamp portion are separated from each other, the clamping space becomes larger, the mobile phone is then placed in the clamping space, and subsequently by an action of the spring member, the first clamp portion and the second clamp portion are close to each other until the mobile phone is clamped.

Preferably, the first sliding groove is provided with a first through entrance at a position corresponding to the second coupling protrusion, the second sliding groove is provided with a second through entrance at a position corresponding to the first coupling protrusion, and the first hook and the second hook respectively pass through the second sliding groove and the first sliding groove from the second through entrance and the first through entrance.

Preferably, the second coupling portion is provided with a first support connecting portion at a predetermined position of a backside of the clamping space.

Preferably, a portion of the first support connecting portion is disposed at the first coupling portion, another portion of the first support connecting portion is disposed at the second coupling portion, and the first support connecting portion is connected with the first coupling portion, but not connected with the second coupling portion.

Preferably, the second clamp portion is provided with a second support connecting portion at a predetermined position of an outer side thereof.

Preferably, the first clamp portion is extended with a first extending clamp portion toward the second coupling portion, and the second clamp portion is extended with a second extending clamp portion toward the first coupling portion.

Preferably, a first reinforcing portion is formed between the first extending clamp portion and the first coupling portion, and a second reinforcing portion is formed between the second extending clamp portion and the second coupling portion.

The advantageous effects of the present invention are as follows. The first coupling protrusion and the first hook are respectively slidable in the second coupling accommodation portion and the second sliding groove; and the second coupling protrusion and the second hook are respectively slidable in the first coupling accommodation portion and the first sliding groove, and the first clamp portion and the second clamp portion are pulled close to each other by the spring member. In the present invention, the components are small in quantity, and the assembly is fast. As such, the problem of the waste of resources during the production of the mobile phone holders can be solved.

In the following description, the mobile phone holder is provided as an example for illustrating the implementation of the present invention. However, the present invention can be used to clamp not only a mobile phone but also a tablet or any other object having a thin plate shape.

BRIEF DESCRIPTION OF THE DRAWINGS

In the following description, a detailed illustration is provided for the present invention through the embodiments with reference to the accompany drawings.

DETAILED DESCRIPTION OF THE PREFERRED EMBODIMENTS

In the following detailed description of the embodiments of the present invention, reference is made to the accompanying drawings, which are shown to illustrate the specific embodiments in which the present invention may be practiced. These embodiments are provided to enable those skilled in the art to practice the present invention. It is understood that other embodiments may be used and that changes can be made to the embodiments without departing from the scope of the present invention. The following description is therefore not to be considered as limiting the scope of the present invention.

Hereinafter, the embodiments of the present invention are described based on FIGS. 1A to 10B. The description is not intended to limit the embodiments of the present invention, but is a kind of embodiment of the present invention.

Figure 1A:
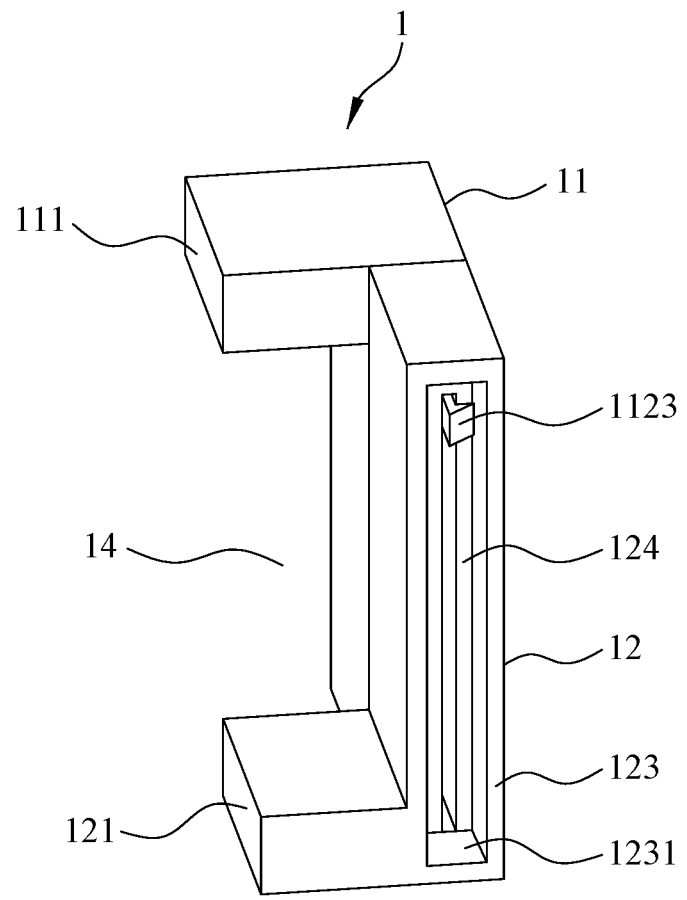
FIG. 1A is a schematic view of a mobile phone holder according to a first embodiment of the present invention.
Figure 1B:
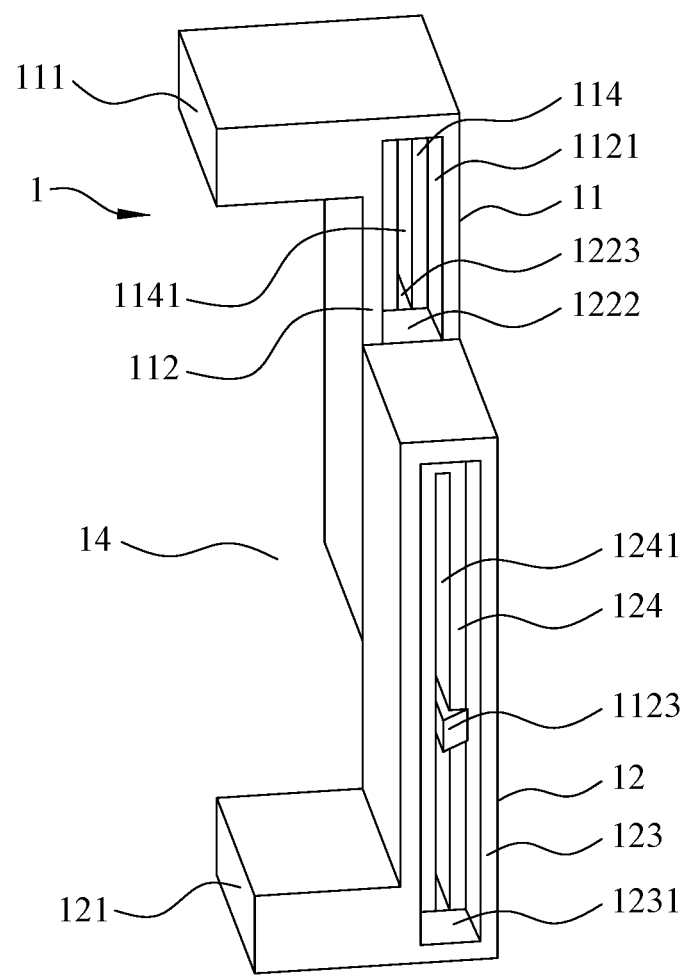
FIG. 1B is a schematic view of the first embodiment of the present invention showing that a first clamp portion and a second clamp portion are in an expanded state.
Figure 1C:
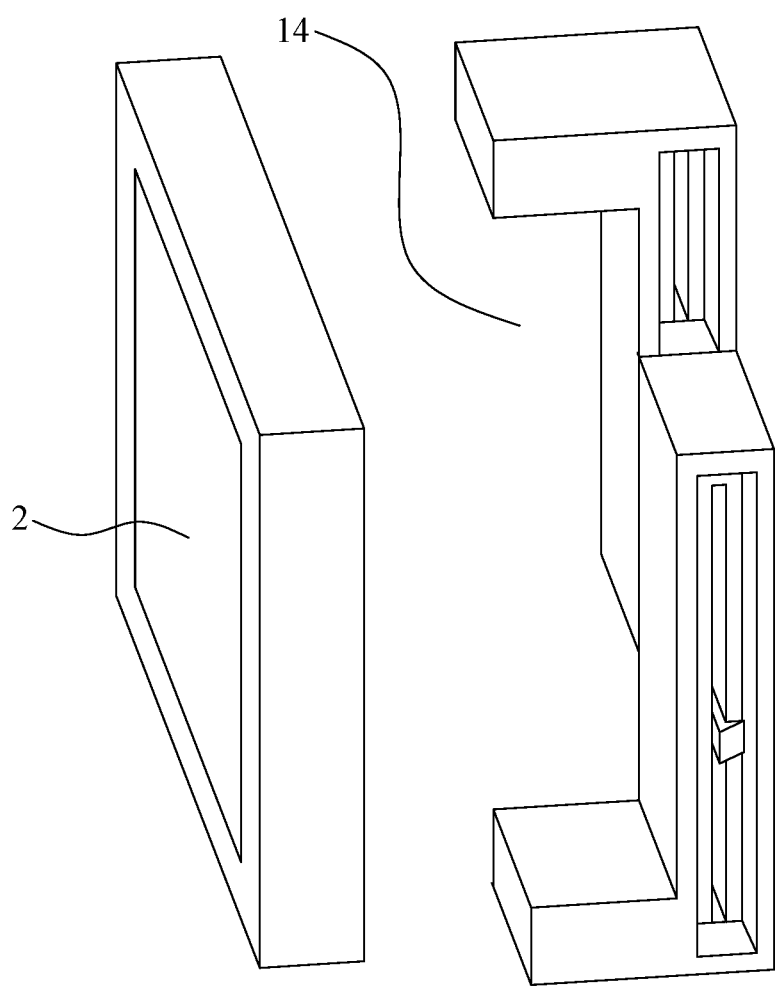
FIG. 1C is a schematic view of the first embodiment of the present invention showing a state before a mobile phone is clamped thereat.
Figure 1D:
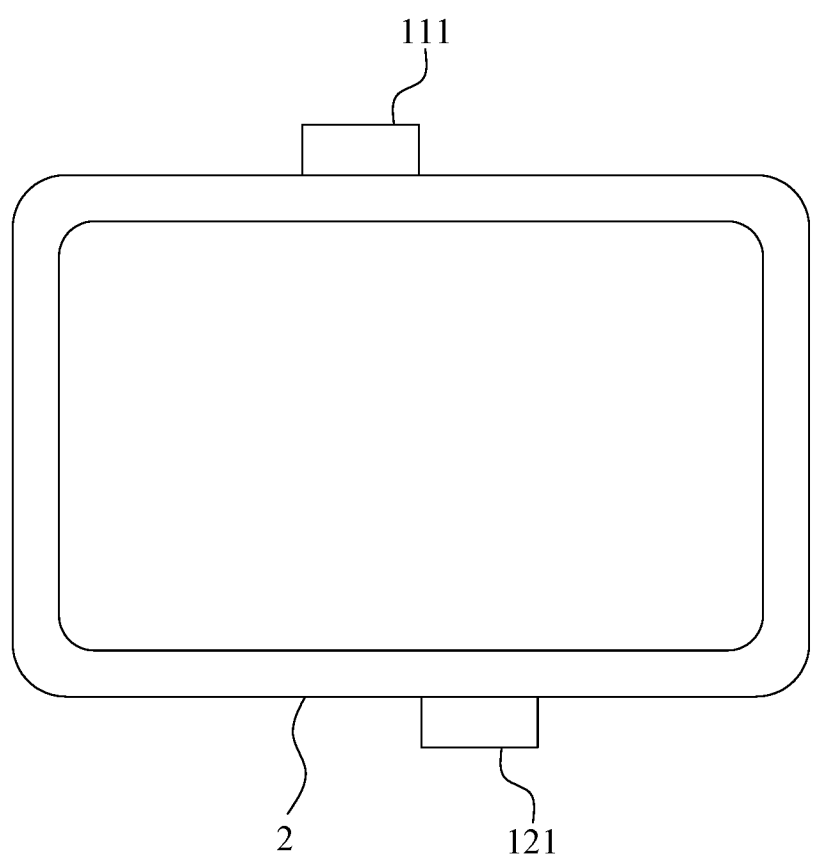
FIG. 1D is a schematic view of the first embodiment of the present invention showing a state after the mobile phone is clamped thereat.
Figure 2A:
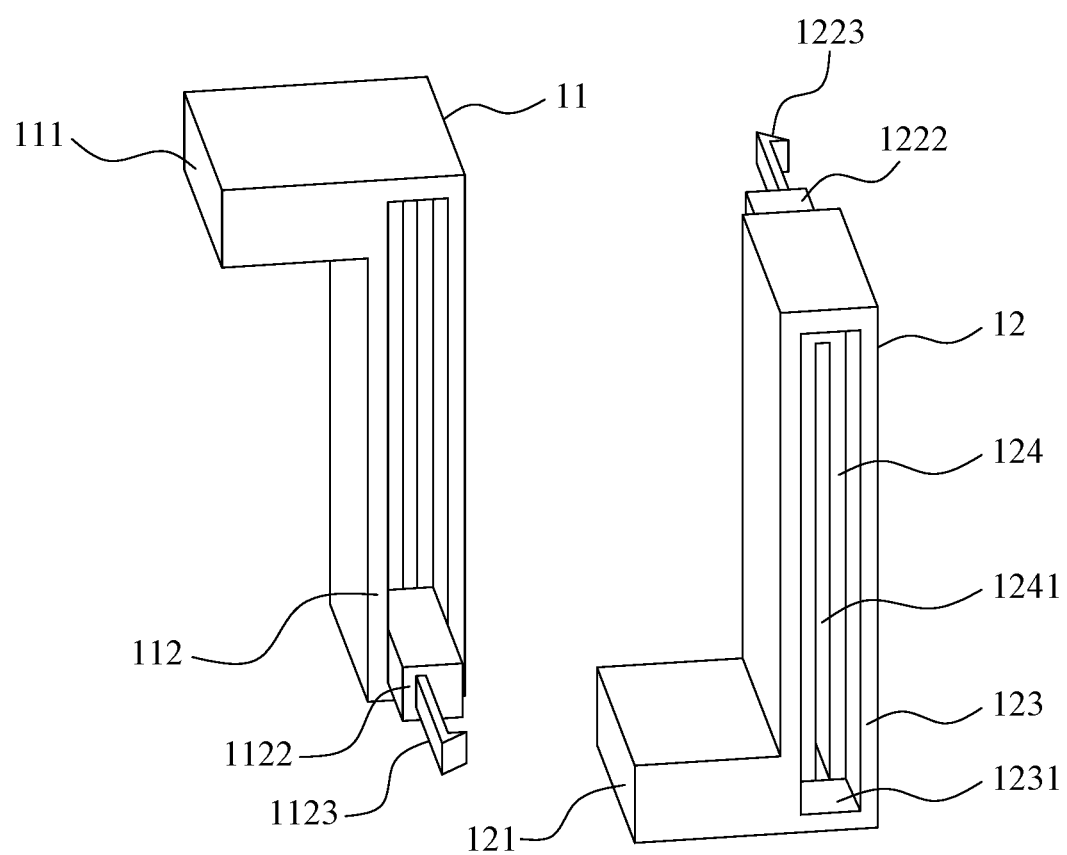
FIG. 2A is a schematic exploded view of the first embodiment of the present invention.
Figure 2B:
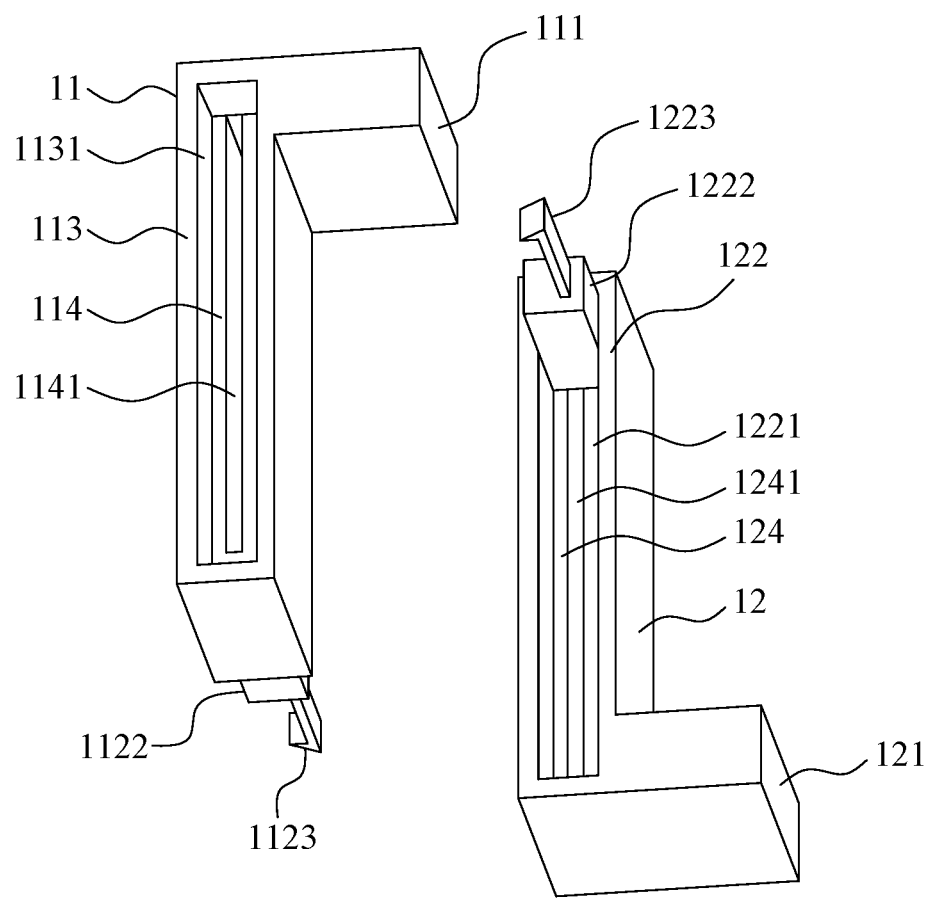
FIG. 2B is another schematic exploded view of the first embodiment of the present invention.
Figure 3A:
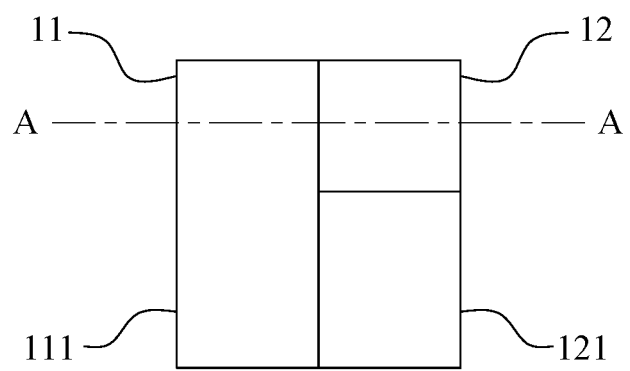
FIG. 3A is a schematic top view of the first embodiment of the present invention.
Figure 3B:
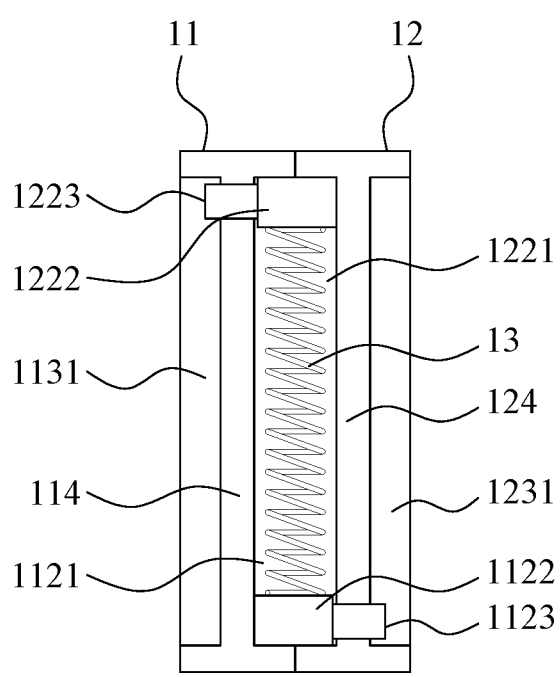
FIG. 3B is a schematic cross-sectional view of the first embodiment of the present invention taken along a line A-A of FIG. 3A.
Figure 3C:
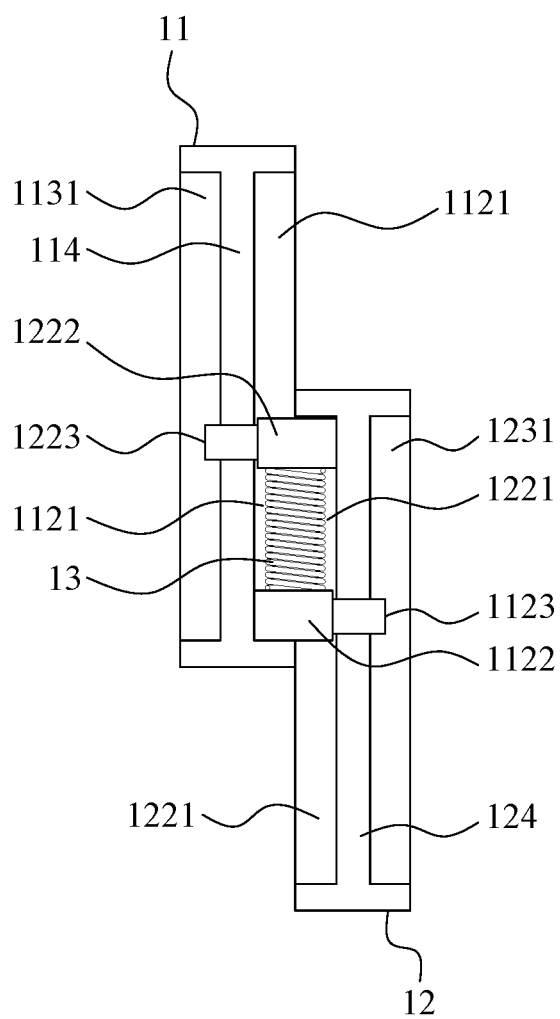
FIG. 3C is a schematic cross-sectional view of the first embodiment of the present invention taken along the line A-A of FIG. 3A showing that the first clamp portion and the second clamp portion are in an expanded state.
Figure 4A:
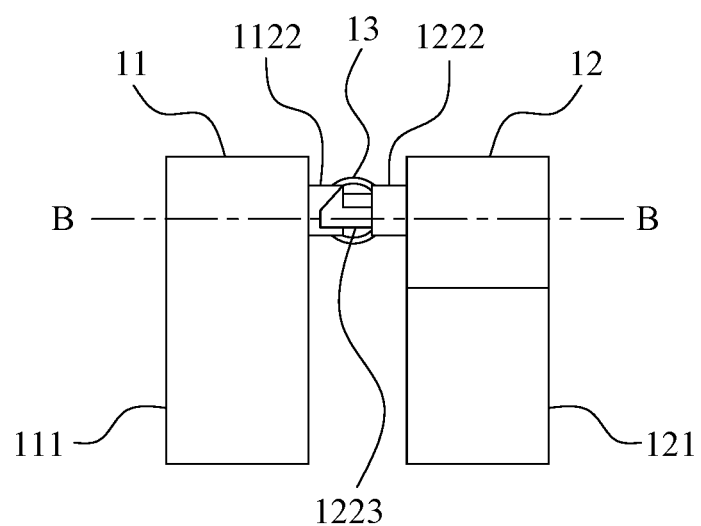
FIG. 4A is a schematic exploded view of the first coupling portion and the second coupling portion of the first embodiment of the present invention.
Figure 4B:
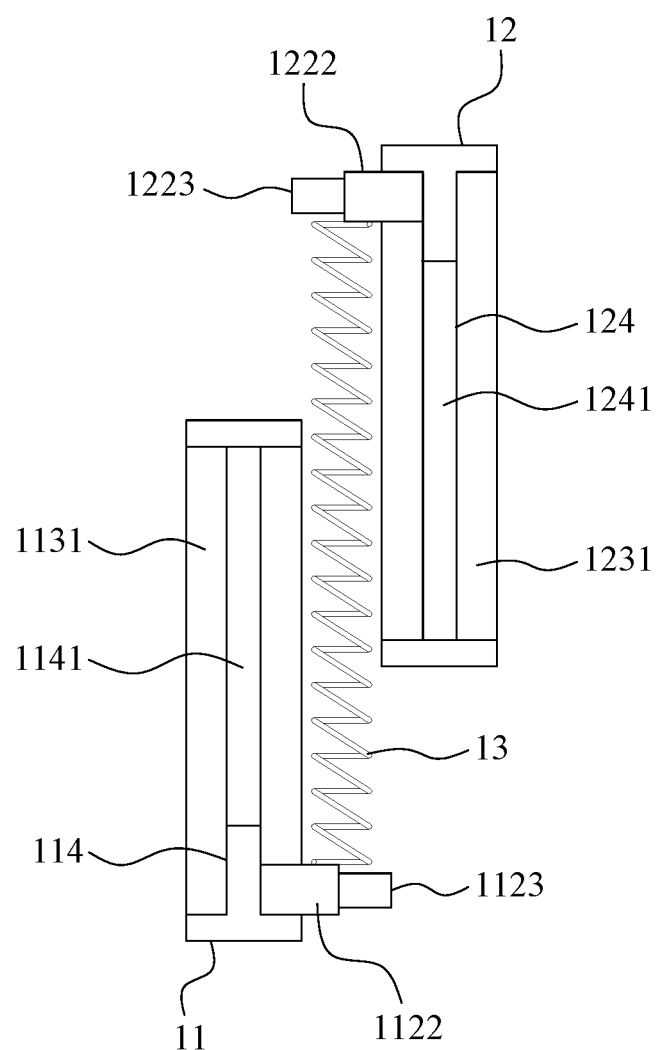
FIG. 4B is a schematic cross-sectional view of the first coupling portion and the second coupling portion of the first embodiment of the present invention taken along a line B-B of FIG. 4A.
Figure 5:
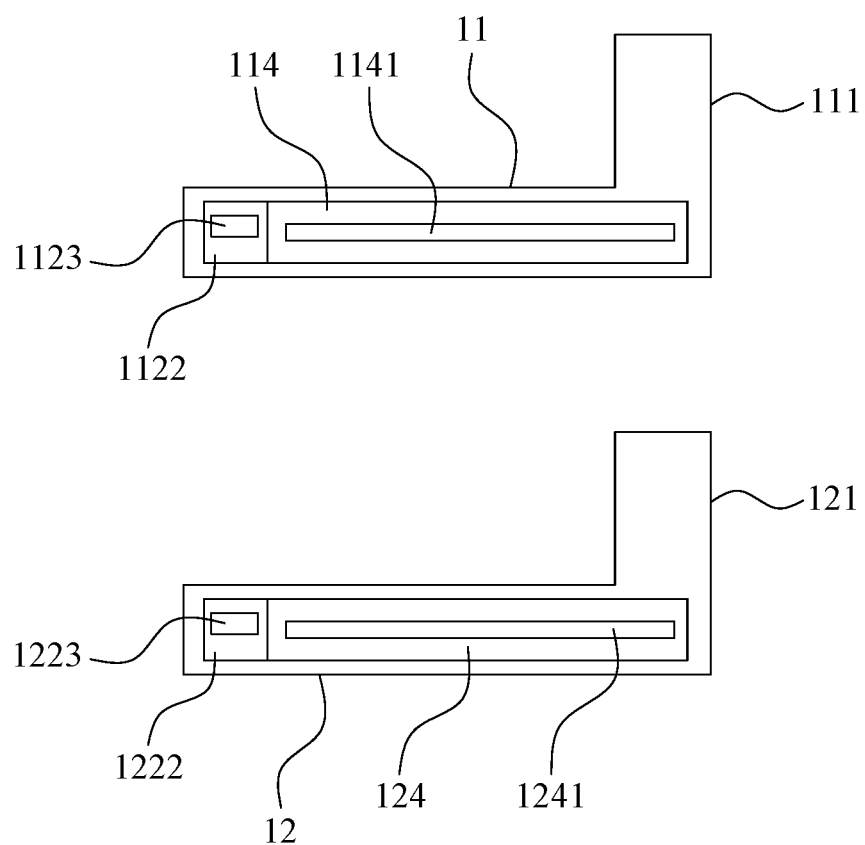
FIG. 5 is another schematic exploded view of the first embodiment of the present invention.

As shown in FIG. 1A to FIG. 5, a slide type mobile phone holder 1 for clamping a mobile phone 2 according to a first embodiment of the present invention, comprises: as shown in FIG. 2A and FIG. 2B, a first coupling portion 11, a second coupling portion 12, and a spring member 13. The first coupling portion 11 has a rectangular shape, wherein an end of the first coupling portion 11 is provided with a first clamp portion 111, a pair of opposite surfaces on both sides of the first coupling portion 11 are respectively defined as a first coupling surface 112 and a first outer surface 113, the first coupling portion 11 is provided with a first coupling accommodation portion 1121 having a rectangular shape and a first outer accommodation portion 1131 having a rectangular shape at the first coupling surface 112 and the first outer surface 113, respectively, and a first coupling wall 114 between the first coupling accommodation portion 1121 and the first outer accommodation portion 1131, the first coupling wall 114 is provided with a first sliding groove 1141, an end of the first coupling accommodation portion 1121 far away from the first clamp portion 111 is provided with a first coupling protrusion 1122, and the first coupling protrusion 1122 is extended with a first hook 1123. The second coupling portion 12 has a rectangular shape, wherein an end of the second coupling portion 12 is provided with a second clamp portion 121, a pair of opposite surfaces on both sides of the second coupling portion 12 are respectively defined as a second coupling surface 122 and a second outer surface 123, the second coupling portion 12 is provided with a second coupling accommodation portion 1221 having a rectangular shape and a second outer accommodation portion 1231 having a rectangular shape at the second coupling surface 122 and the second outer surface 123, respectively, and a second coupling wall 124 between the second coupling accommodation portion 1221 and the second outer accommodation portion 1231, the second coupling wall 124 is provided with a second sliding groove 1241, an end of the second coupling accommodation portion 1221 far away from the second clamp portion 121 is provided with a second coupling protrusion 1222, and the second coupling protrusion 1222 is extended with a second hook 1223. As shown in FIG. 3A to FIG. 4B, the first clamp portion 111 and the second clamp portion 121 are arranged toward a same direction, the first coupling surface 112 and the second coupling surface 122 are opposite to each other, two ends of the spring member 13 respectively abut against the first coupling protrusion 1122 and the second coupling protrusion 1222, the first coupling protrusion 1122 is inserted into the second coupling accommodation portion 1221, the first hook 1123 passes through the second sliding groove 1241 and hooks the second coupling wall 124 inside the second outer accommodation portion 1231, meanwhile the second coupling protrusion 1222 is inserted into the first coupling accommodation portion 1121, the second hook 1223 passes through the first sliding groove 1141 and hooks the first coupling wall 114 inside the first outer accommodation portion 1131, the first coupling protrusion 1122 and the first hook 1123 are respectively slidable in the second coupling accommodation portion 122 and the second sliding groove 1241, the second coupling protrusion 1222 and the second hook 1223 are respectively slidable in the first combining accommodation portion 1121 and the first sliding groove 1141. As shown in FIG. 1B, a clamping space 14 is formed between the first clamp portion 111 and the second clamp portion 121. When the first clamp portion 111 and the second clamp portion 121 are separated from each other and the clamping space 14 becomes larger. As shown in FIG. 1C, the mobile phone 2 is then placed in the clamping space 14, and subsequently by an action of the spring member, as shown in FIG. 1D, the first clamp portion 111 and the second clamp portion 121 are close to each other until the mobile phone is clamped.

Figure 6:
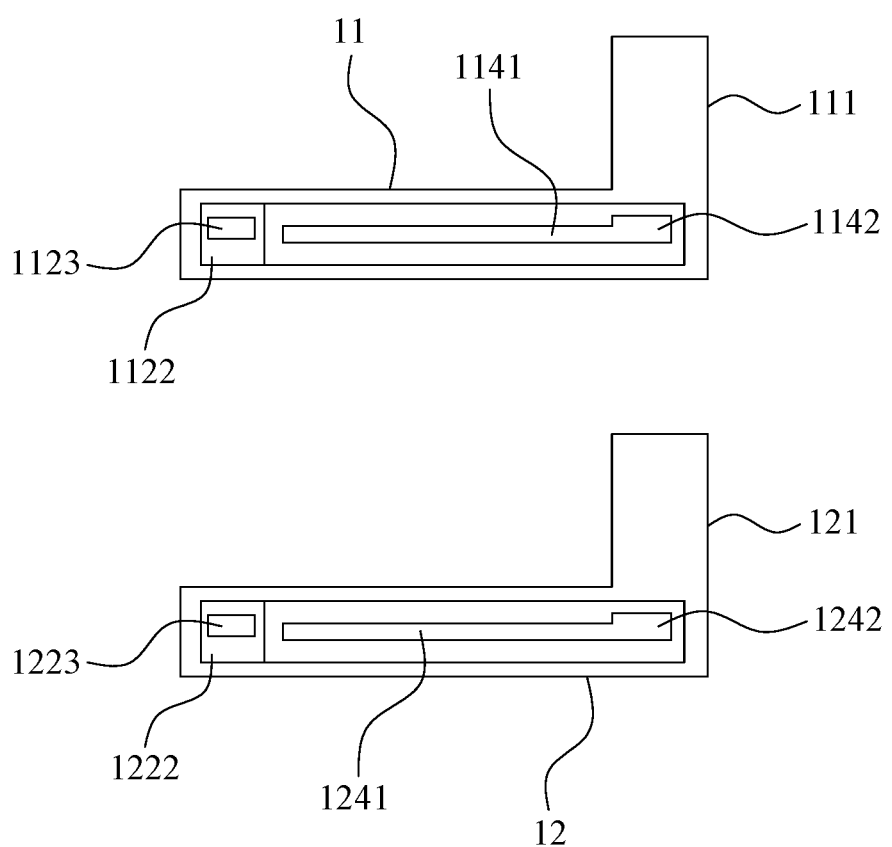
FIG. 6 is a schematic exploded view of a second embodiment of the present invention.

As shown in FIG. 6, which is a second embodiment of the present invention, the first sliding groove 1141 is provided with a first through entrance 1142 at a position corresponding to the second coupling protrusion 1222, the second sliding groove 1241 is provided with a second through entrance 1242 at a position corresponding to the first coupling protrusion 1122, and the first hook 1123 and the second hook 1223 respectively pass through the second sliding groove 1241 and the first sliding groove 1141 from the second through entrance 1242 and the first through entrance 1142. The first through entrance 1142 and the second through entrance 1242 of this embodiment allow the second hook 1223 and the first hook 1123 to pass through the second sliding groove and the first sliding groove more easily, respectively, and thus the production efficiency can be increased.

Figure 7A:
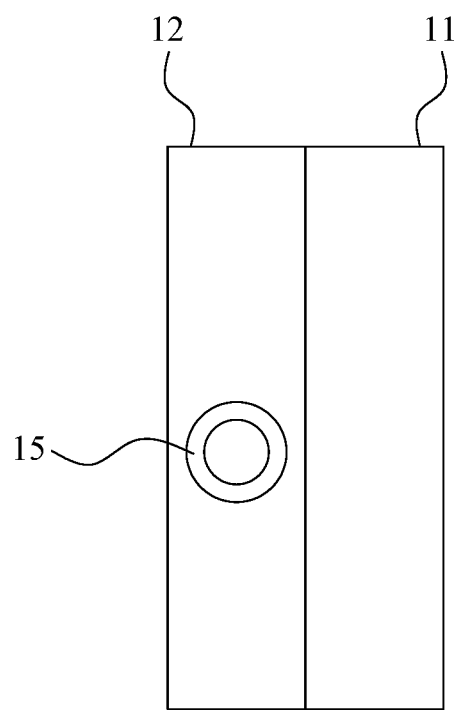
FIG. 7A is a schematic rear view of a third embodiment of the present invention.
Figure 7B:
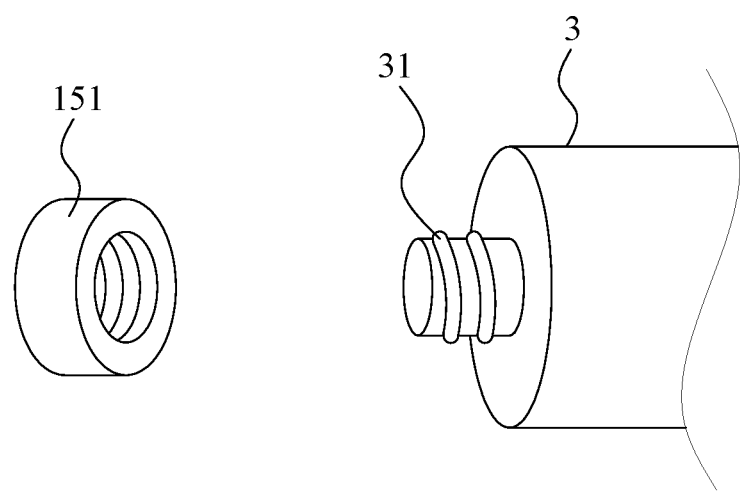
FIG. 7B is a schematic view showing a first support connecting portion and a support with a screw head of the third embodiment of the present invention.
Figure 7C:
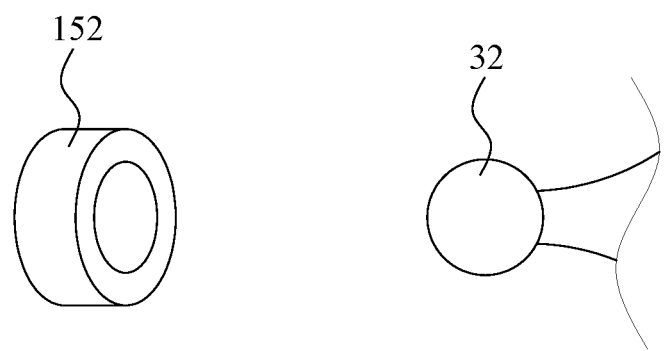
FIG. 7C is a schematic view showing another first support connecting portion and another support with a ball head of the third embodiment of the present invention.

As shown in FIG. 7A to FIG. 7C, which is a third embodiment of the present invention, the second coupling portion 12 is provided with a first support connecting portion 15 at a predetermined position of a backside of the clamping space 14, and the first support connecting portion 15 is used to connect with a support 3. As shown in FIG. 7B and FIG. 7C, the first support connecting portion 15 of this embodiment may be a ball accommodation portion 152, a nut connecting portion 151, or a connector of any other type. The ball accommodation portion 152 is connected with a ball head 32 of the support. The nut connecting portion 151 is connected with a screw head 31 of the support.

Figure 7D:
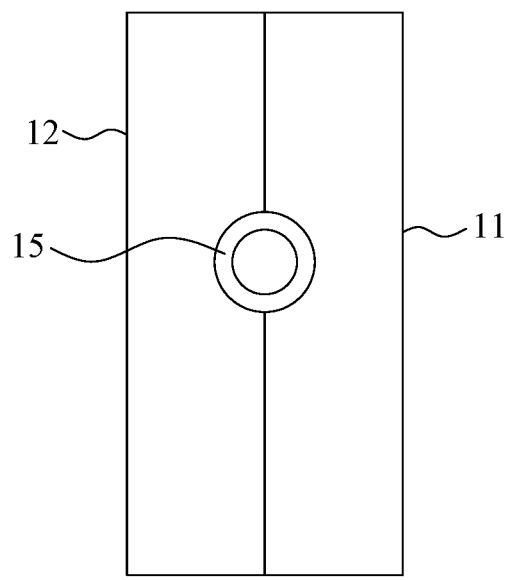
FIG. 7D is a schematic view of a fourth embodiment of the present invention.
Figure 7E:
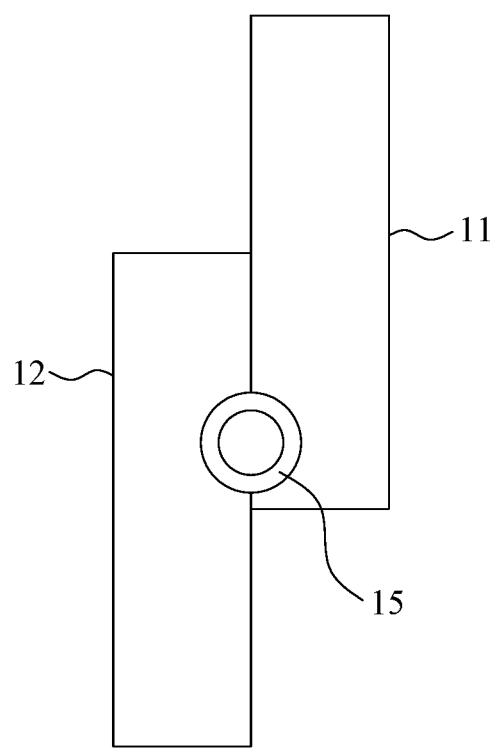
FIG. 7E is a schematic view of the fourth embodiment of the present invention showing the first clamp portion and the second clamp portion are in an expanded state.

Preferably, as shown in FIG. 7D and FIG. 7E, which is a fourth embodiment of the present invention, a portion of the first support connecting portion 15 is disposed at the first coupling portion 11, another portion of the first support connecting portion 15 is disposed at the second coupling portion 12, and the first support connecting portion 15 is connected with the first coupling portion 11, but not connected with the second coupling portion 12. In this embodiment, the first support connecting portion 15 can be moved to a position of a center of gravity of the slide type mobile phone holder 1, so as to improve stability in use.

Figure 8:
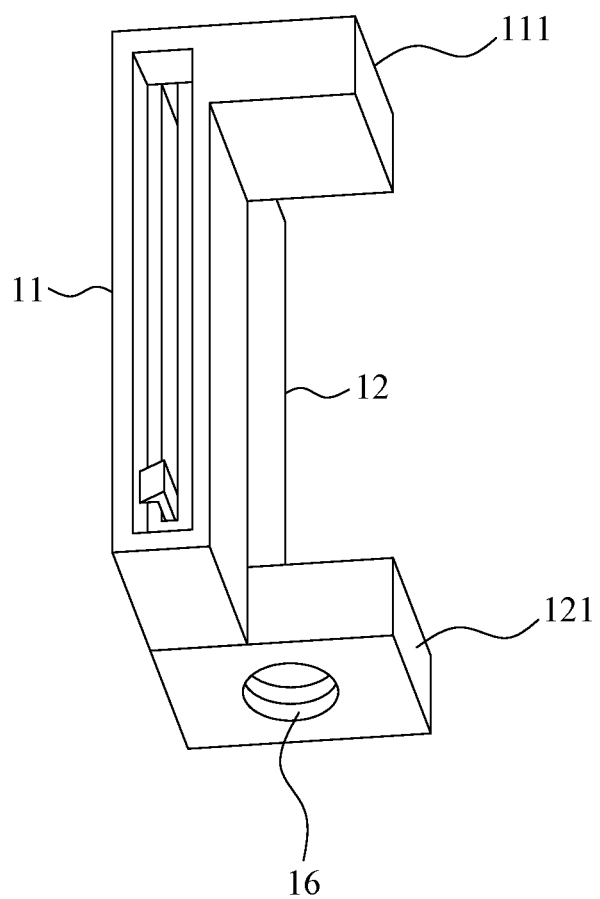
FIG. 8 is a schematic view of a fifth embodiment of the present invention.

As shown in FIG. 8, which is a fifth embodiment of the present invention, the second clamp portion 121 is provided with a second support connecting portion 16 at a predetermined position of an outer side thereof.

Figure 9:
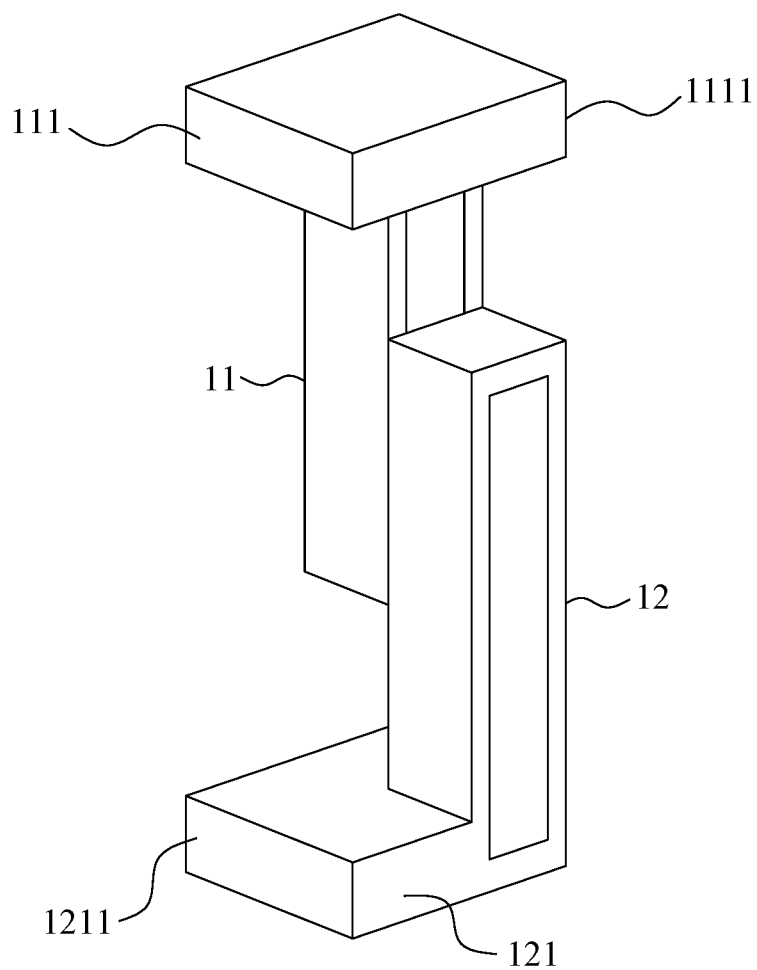
FIG. 9 is a schematic view of a sixth embodiment of the present invention.

As shown in FIG. 9, which is a sixth embodiment of the present invention, the first clamp portion 111 is extended with a first extending clamp portion 1111 toward the second coupling portion 12, and the second clamp portion 121 is extended with a second extending clamp portion 1211 toward the first coupling portion 11. In this embodiment, the contact area between the slide type mobile phone holder 1 and the mobile phone 2 can be increased, and thus the frictional force therebetween can be increased.

Figure 10A:
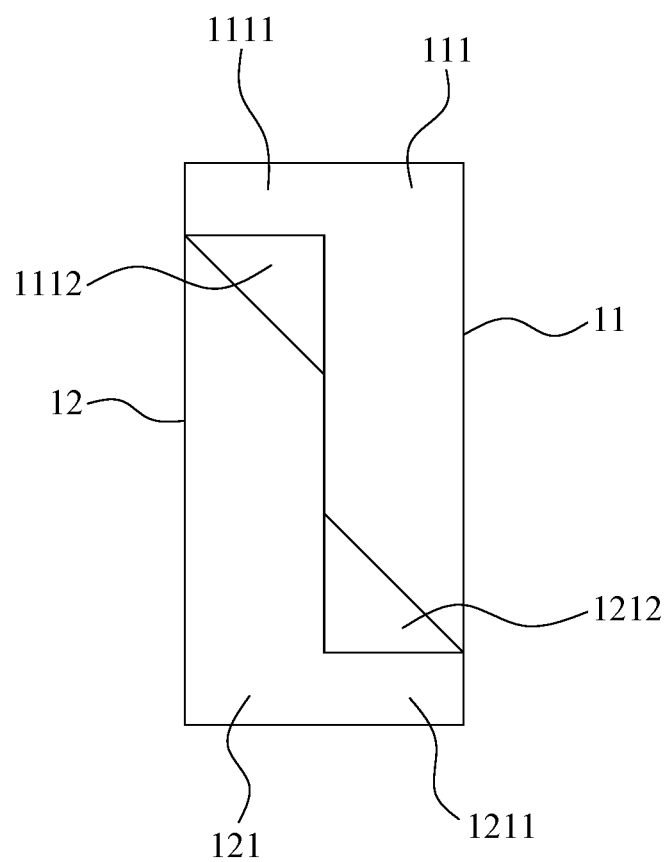
FIG. 10A is a schematic view of a seventh embodiment of the present invention.
Figure 10B:
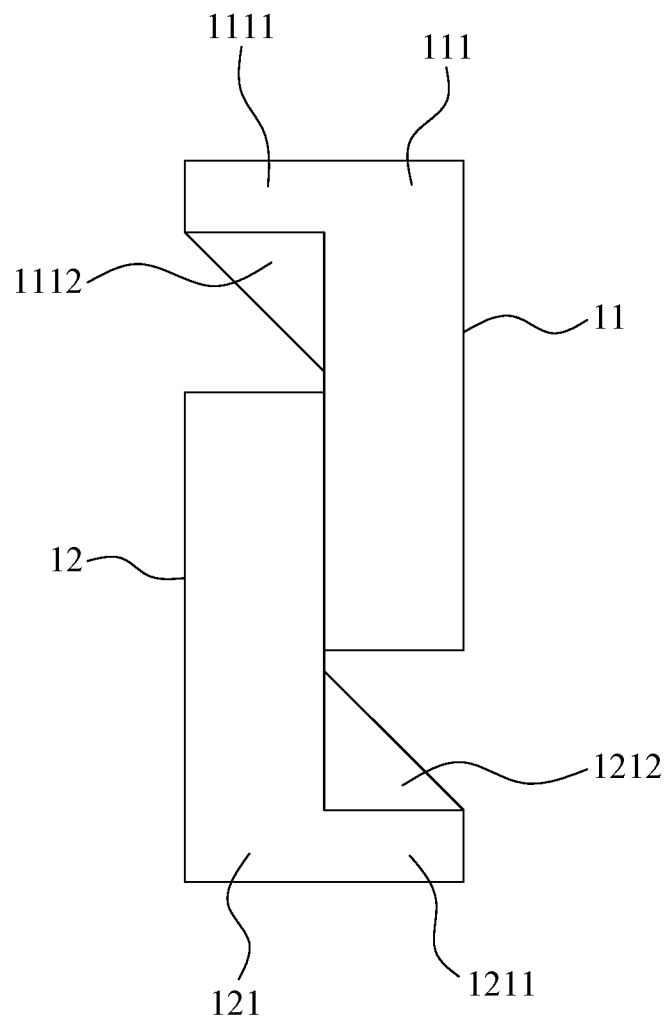
FIG. 10B is a schematic view of the seventh embodiment of the present invention showing that the first clamp portion and the second clamp portion are in an expanded state.

As shown in FIG. 10A and FIG. 10B, which is a seventh embodiment of the present invention, a first reinforcing portion 1112 is formed between the first extending clamp portion 1111 and the first coupling portion 11, a second reinforcing portion 1212 is formed between the second extending clamp portion 1211 and the second coupling portion 12, and the first reinforcing portion 1112 and the second clamp portion 121 are disposed at the backside of the clamping space 14. In this embodiment, the supporting force of the first extending clamp portion 1111 and the second extending clamp portion 1211 can be increased.

Although the present invention has been described with reference to the preferred embodiments, it will be apparent to those skilled in the art that a variety of modifications and changes in form and detail may be made without departing from the scope of the present invention defined by the appended claims.

What is claimed is:

1. A slide type mobile phone holder for clamping a mobile phone, comprising:
   a first coupling portion having a rectangular shape, wherein an end of the first coupling portion is provided with a first clamp portion, a pair of opposite surfaces on both sides of the first coupling portion are respectively defined as a first coupling surface and a first outer surface, the first coupling portion is provided with a first coupling accommodation portion having a rectangular shape and a first outer accommodation portion having a rectangular shape at the first coupling surface and the first outer surface, respectively, and a first coupling wall between the first coupling accommodation portion and the first outer accommodation portion, the first coupling wall is provided with a first sliding groove, an end of the first coupling accommodation portion far away from the first clamp portion is provided with a first coupling protrusion, and the first coupling protrusion is extended with a first hook;

a second coupling portion having a rectangular shape, wherein an end of the second coupling portion is provided with a second clamp portion, a pair of opposite surfaces on both sides of the second coupling portion are respectively defined as a second coupling surface and a second outer surface, the second coupling portion is provided with a second coupling accommodation portion having a rectangular shape and a second outer accommodation portion having a rectangular shape at the second coupling surface and the second outer surface, respectively, and a second coupling wall between the second coupling accommodation portion and the second outer accommodation portion, the second coupling wall is provided with a second sliding groove, an end of the second coupling accommodation portion far away from the second clamp portion is provided with a second coupling protrusion, and the second coupling protrusion is extended with a second hook; and a spring member;

wherein the first clamp portion and the second clamp portion are arranged toward a same direction, the first coupling surface and the second coupling surface are opposite to each other, two ends of the spring member respectively abut against the first coupling protrusion and the second coupling protrusion, the first coupling protrusion is inserted into the second coupling accommodation portion, the first hook passes through the second sliding groove and hooks the second coupling wall inside the second outer accommodation portion, meanwhile the second coupling protrusion is inserted into the first coupling accommodation portion, the second hook passes through the first sliding groove and hooks the first coupling wall inside the first outer accommodation portion, the first coupling protrusion and the first hook are respectively slidable in the second coupling accommodation portion and the second sliding groove, the second coupling protrusion and the second hook are respectively slidable in the first coupling accommodation portion and the first sliding groove, a clamping space is formed between the first clamp portion and the second clamp portion, when the first clamp portion and the second clamp portion are separated from each other, the clamping space becomes larger, the mobile phone is then placed in the clamping space, and subsequently by an action of the spring member, the first clamp portion and the second clamp portion are close to each other until the mobile phone is clamped.

2. The slide type mobile phone holder according to claim 1, wherein the first sliding groove is provided with a first through entrance at a position corresponding to the second coupling protrusion, the second sliding groove is provided with a second through entrance at a position corresponding to the first coupling protrusion, and the first hook and the second hook respectively pass through the second sliding groove and the first sliding groove from the second through entrance and the first through entrance.

3. The slide type mobile phone holder according to claim 1, wherein the second coupling portion is provided with a first support connecting portion at a predetermined position of a backside of the clamping space.

4. The slide type mobile phone holder according to claim 3, wherein a portion of the first support connecting portion is disposed at the first coupling portion, another portion of the first support connecting portion is disposed at the second coupling portion, and the first support connecting portion is connected with the first coupling portion, but not connected with the second coupling portion.

5. The slide type mobile phone holder according to claim 1, wherein the second clamp portion is provided with a second support connecting portion at a predetermined position of an outer side thereof.

6. The slide type mobile phone holder according to claim 1, wherein the first clamp portion is extended with a first extending clamp portion toward the second coupling portion, and the second clamp portion is extended with a second extending clamp portion toward the first coupling portion.

7. The slide type mobile phone holder according to claim 6, wherein a first reinforcing portion is formed between the first extending clamp portion and the first coupling portion, and a second reinforcing portion is formed between the second extending clamp portion and the second coupling portion.

* * * * *